Dec. 15, 1931.  A. O. ABBOTT, JR  1,836,057

METHOD OF MAKING TIRES AND PRODUCT

Filed July 30, 1926

INVENTOR:-
Adrian O. Abbott, Jr.
BY
Ernest Hopkinson
ATTORNEY

Patented Dec. 15, 1931

1,836,057

UNITED STATES PATENT OFFICE

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN

METHOD OF MAKING TIRES AND PRODUCT

Application filed July 30, 1926. Serial No. 125,929.

This invention relates to pneumatic tires for vehicles and method of making the same, but more particularly to an improvement in the art of flat building such tires and has for its primary objects to facilitate the construction and provide an improved tire.

The invention is particularly applicable to the manufacture of either straight side or clincher tires and consists primarily in building the tire carcass in the form of a slab containing most of the elements of the built tire and thereafter splicing the ends of the slab to bring the same to annular form and applying bead rings. The spliced slab or "pulley band" as it is generally termed is then shaped or expanded in any well-known manner, as for example the vacuum method, and subsequently vulcanized.

Further objects are to eliminate the necessity for the exercise of considerable ingenuity and skill and the expenditure of time in interlocking plies and turning them over the beads separately; to provide an improved method of turning the plies over the bead and thereby obtaining a smoother outside wall; to eliminate the step-offs of the turn plies and thus largely overcome the tendency of the tire to break at the edge of such ply; to provide a simple and effective method of arranging and splicing the elements of the tire; and to provide an improved method of incorporating the bead rings in straight side tires.

The many other objects and advantages of the invention will be better understood by reference to the following specification when considered in connection with the accompanying drawings illustrating a selected embodiment thereof in which.

Figure 1:
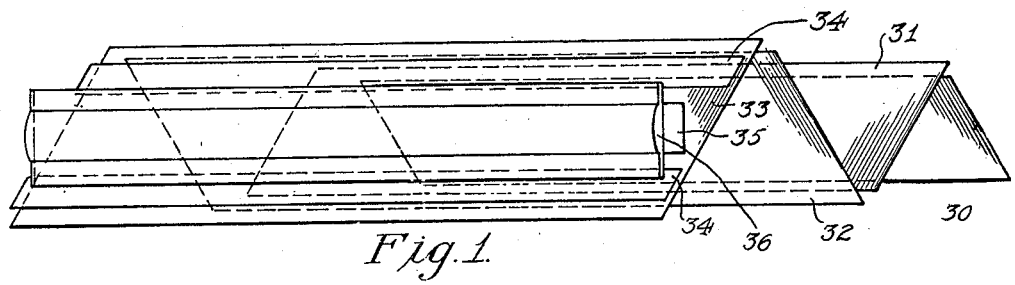
Fig. 1 is a top plan view of a straight side tire slab.

Referring particularly to the drawings, the initial step is the formation of a slab which is illustrated in Fig. 1.

Figure 2:
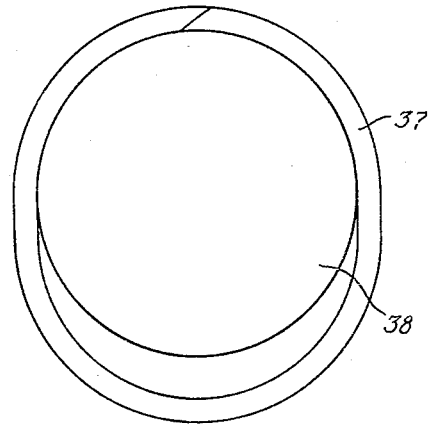
Figs. 2 and 3 are diagrammatical views illustrating methods of supporting the straight side tire slab during the splicing operation and applying the bead wires respectively.

The slab illustrated in Fig. 1 is a slab for a straight side tire in which fabric plies are designated 30, 31, 32 and 33, chafing strips 34, a breaker 35 and a tread 36. The tread in this showing is a widened strip which serves as sidewalls also. The number of plies may of course be varied. The plies of fabric taken together constitute a carcass. The plies in the slab are of different widths, the inner ply being the narrowest and the other plies being slightly wider than the one beneath. In the preferred construction, each superimposed ply is wider than the one beneath, and the threads of the fabric extend obliquely to the plane of the tire. The threads of adjacent plies of the fabric preferably extend at opposite angles. The ends of the elements are stepped off to provide laps for splicing the slab ends to form a band. Fig. 2 shows the completed slab 37 upon a supporting drum 38.

Figure 3:
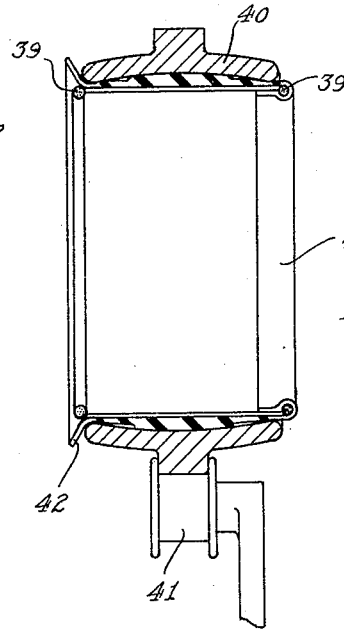

After splicing the slab to form a pulley-band an advantageous method of applying the bead rings 39 to the pulley-band is illustrated diagrammatically in Fig. 3. The bead rings 39 have been formed from bead wire or from rubber composition or from both by cutting it to proper length and then splicing the ends. A shell 40, shaped to fit the periphery of the pulley-band is supported in any suitable manner and driven by flanged rollers 41. The pulley-band is inserted in the shell which is narrower than the pulley-band so that the edge portions of the latter project beyond the corresponding edges of the former. The shell is rotated at high speed, causing the free edge portions of the fabric to spread outwardly under the action of centrifugal force in the manner indicated at 42. In place of the flanged roller with its friction drive it is evident that other suitable means to spread the edges of the fabric so that a bead to be inserted may be used. For example, gear teeth may be mounted on the shell 40 which will cooperate with a driving gear wheel instead of wheel 41. When the edge portions of the fabric are spread outwardly, the bead rings are then applied by spinning them into place. These rings are placed upon any suitable revolving mechanism whereby they will be rotated at approximately the speed of the wheel 40. They may then be brought into their proper position in the pulley-band. Other methods may be used for applying the bead wires to the pulley-band, this being merely an example of one method which has been found convenient. Having placed the bead rings in position, the operator turns the ply material over them. This may be done manually or mechanically. It should be noted that the fabric is being turned inwardly over the ply as indicated at 43, instead of outwardly, as is the usual custom.

The turning of the plies inwardly over the bead ring in the manner described is advantageous for the reason that it eliminates the step-offs of the turn plies and very materially decreases the liability of the tire breaking at the edge of the plies. It likewise presents a smoother outside wall which prevents unevenness in the rubber material and to a large extent eliminates blemishes which are caused in the molding operation on account of the irregularity of the plies on the outside of the carcass. When the fabric is turned inwardly in the manner described the inside of the finished tire is as smooth as where the fabric is turned outwardly and it is almost impossible to detect the edges of the turn plies. This method facilitates the construction of the tire as all plies may be turned at once, thus eliminating the necessity for the exercise of considerable ingenuity and skill and the time required for interlocking plies and turning them over the bead ring separately.

Figure 4:
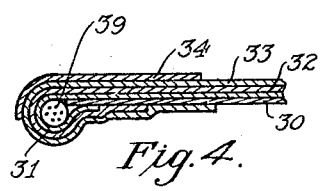
Fig. 4 is an enlarged detail sectional view of the bead portion of the pulley-band after the bead has been incorporated therein.
Figure 5:
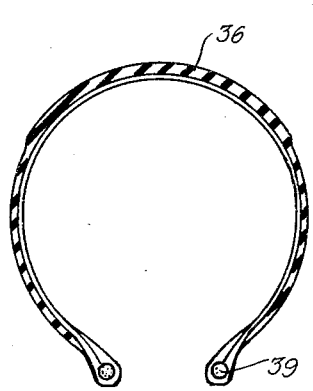
Fig. 5 is a transverse section of the completed straight side tire.

In Fig. 4 of the drawings is shown an enlarged view of the marginal portions of the pulley-band after the bead rings have been applied but with the gum of the sidewall omitted. The pulley-band is next expanded or brought to tire form in any suitable manner, such as by the application of differential pressure in a shaping box.

Figure 6:
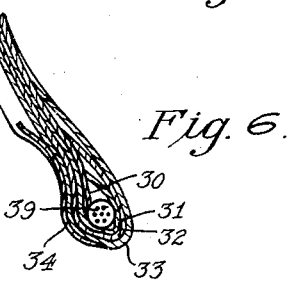
Fig. 6 is an enlarged detail sectional view of the bead portion of the completed straight side tire.

Figure 6 is an enlarged sectional view of the bead portion of the straight side tire which shows that the inside of the finished tire presents a smooth surface where the plies overlap while the outside surface is also smooth.

It will be evident from the foregoing description that the method of building tires forming the subject matter of the present invention facilitates the construction and provides an improved tire. The various steps are simply and easily performed and do not require the exercise of particular ingenuity or skill. Considerable time is saved by the elimination of the usual interlocking plies and the turning of these plies over the bead separately. The turning inwardly of the fabric over the bead facilitates the insertion of the bead ring and permits of a smoother outside wall. The elimination of step-offs on the outside of the tire overcomes the tendency of the tire to break along the edges of the plies. The pressure on the inside of the tire when in use tends rather to compress the turn plies and to hold them together and not to tear them apart. The method of inserting the bead ring by rapidly rotating the pulley-band in a shell to cause the edge portions of a pulley-band to expand and then spinning the bead ring into position is simple and advantageous.

One application of the method forming the subject matter of this invention has been hereinbefore described but it is to be understood that it is solely for the purpose of illustration as different embodiments of the invention may be made without departing from the spirit thereof and it is not intended that the invention should be limited to any specific form except as determined by the scope of the appended claims.

Having thus described my invention, what I claim and desire to protect by Letters Patent is:

1. As an article of manufacture, a tire casing comprising superimposed plies of fabric, bead material carried thereby, said plies of fabric having turned in marginal portions which lie upon the inner surface of the carcass enclosing the bead material, the turned in edge portions being of different lengths with the longest outermost.

2. As an article of manufacture, a slab of material for tire manufacture comprising a plurality of superimposed plies of fabric the outer ply of which is wider than the inner plies.

3. As an article of manufacture, a slab of material for tire manufacture comprising a plurality of superimposed plies of fabric of progressively greater widths.

4. As an article of manufacture, a pulley band comprising plies of superimposed fabric having turned in marginal portions adjoining the surface of the inner ply, bead material enclosed by the turned in marginal portions, the said marginal portions overlapping each other in stepped relation with the widest outermost.

5. In the method of building a tire casing, the steps which comprise superimposing plies of fabric and rubber composition to form a substantially flat slab, splicing the ends of the slab to form a pulley band and applying bead material to the interior of the pulley band.

6. In the method of building a tire casing, the steps which comprise superimposing plies of fabric and rubber composition to form a substantially flat slag, splicing the ends of the slab to form a pulley band, placing bead material within the pulley band spaced from the edges thereof and folding the longitudinal edge portions of the pulley band inwardly over the bead material.

7. The method of applying bead material to a pulley band which comprises inserting an annular ring of the bead material within the pulley band to a position in spaced relation from its edges and folding the edge portions of the band inwardly over the bead material.

8. The method of applying bead material to a pulley band which comprises effecting rotary movement of the pulley band whereby the edge portions thereof are swung outwardly, rotating a ring of the bead material in the same direction and at approximately the same speed as the pulley band, inserting the ring of bead material within the outwardly extending edge portions of the rotating band, stopping the rotation of the band and bead material, and turning the edge portions of the band inwardly over the bead material.

9. As an article of manufacture, a tire casing comprising superimposed plies of fabric and bead material associated therewith, the plies of fabric extending around the bead material and terminating upon the inner surface of the side walls of the casing.

10. The method of building a tire casing which consists in superimposing and splicing the fabric plies and the tread in the proper order to form a substantially flat slab, splicing the ends of the formed slab to form a pulley band, applying bead material to the pulley band, expanding the pulley band to tire form, and vulcanizing.

11. As an article of manufacture, a slab of material for tire manufacture comprising a plurality of superimposed plies of fabric, the outer ply of which is wider than and extends beyond the edges of the inner plies.

12. As an article of manufacture, a slab of material for tire manufacture comprising a plurality of superimposed plies of fabric of progressively greater widths from an inner ply to an outer ply.

Signed at Detroit, county of Wayne, State of Michigan, this 26th day of July, 1926.

ADRIAN O. ABBOTT, Jr.